United States Patent

Taylor et al.

[11] Patent Number: 5,175,067
[45] Date of Patent: Dec. 29, 1992

[54] FEED THROUGH

[75] Inventors: William J. Taylor, Anoka; Joseph F. Lessar, Coon Rapids, both of Minn.

[73] Assignee: Medtronic, Inc., Minneapolis, Minn.

[21] Appl. No.: 611,902

[22] Filed: Nov. 9, 1990

Related U.S. Application Data

[63] Continuation-in-part of Ser. No. 379,481, Jul. 12, 1989, abandoned.

[51] Int. Cl.⁵ .............................................. H01M 2/08
[52] U.S. Cl. .................................... 429/181; 429/180; 429/184; 428/432; 428/433; 174/50.61
[58] Field of Search ..................... 429/180, 181, 184; 428/432, 433; 174/50.61

[56] References Cited

U.S. PATENT DOCUMENTS

| | | | |
|---|---|---|---|
| 4,053,692 | 10/1977 | Dey | 429/181 |
| 4,556,613 | 12/1985 | Taylor et al. | 429/181 |
| 4,587,144 | 5/1986 | Kellerman et al. | 429/181 |

OTHER PUBLICATIONS

Douglas et al. "Ampule Test to Simulate Glass Corrosion in Ambient Temperature Lithium Batteries", *Sandia Report* vol. 2, Jun. 10, 1984.

*Heat Treatment, Structure and Properties of Nonferrous Alloys,* Appendix 3 and 4 from Metals Progress Databook (ASM), 1979 and 1980.

*Primary Examiner*—Mark L. Bell
*Assistant Examiner*—C. M. Bonner
*Attorney, Agent, or Firm*—Daniel W. Latham; Harold R. Patton

[57] ABSTRACT

Use of molydenum-containing alloys to induce wetting by TA-23 glass in metallic feedthroughs.

17 Claims, 4 Drawing Sheets

FEED THROUGH

BACKGROUND OF THE INVENTION

This is a continuation-in-part of application Ser. No. 379,481, filed Jul. 12, 1989, now abandoned.

FIELD OF THE INVENTION

Glass seals are used in various feedthrough arrangements including electrochemical cells. For example, in cell headers, glass seals are used to seal the cell container while allowing one or more electrical contacts to extend through the seal for interior/exterior connection. The term "feedthrough" shall be used herein to describe such arrangements in a general sense.

In certain electrochemical cells, glass corrosion has been encountered. For example, batteries of the $Li/SO_2$ system, $Li/SOCl_2$ system and other organic electrolyte systems have given rise to corrosion and cracking of the glass seals. Special glass compositions have been developed to combat such problems. Sandia National Laboratories has been instrumental in developing a low-silica composition glass (less than about 50 weight percent) which is generally known as TA-23 glass.

Although this glass has been a desirable improvement from the corrosion and cracking standpoint, it has been difficult to find metal alloys which will be reliable wet by the glass to form strong, hermetic seals with it and which work well in the other aspects of seal forming such as weldability, machinability, availability and cost. A purpose of this invention is to provide a combination of acceptable alloys with TA-23 glass for feedthroughs and the like. There is thus provided a new and improved feedthrough arrangement comprising TA-23 glass and the alloys set forth herein.

SUMMARY OF THE INVENTION

This invention relates to feedthroughs and other glass seals which utilize in combination TA-23 glass and a molybdenum alloy consisting essentially of molybdenum, chromium and nickel wherein the amount of molybdenum is equal to or greater than 1.3 atomic percent (A %). Such feedthroughs are particularly useful in aggressive lithium electrochemical cell environments because they exhibit good wetting of the metal by the glass and good corrosive resistance. In a preferred embodiment the invention relates more specifically to hermetic, corrosion resistant, compression-type sealed feedthroughs utilizing single or multiple terminal(s) or pin(s) of niobium, molybdenum, tantalum or the like inserted through a TA-23 glass seal which is contained within a header or sleeve of one of several specific molybdenum alloys, MP35N being preferred. In its most preferred form this preferred feedthrough arrangement is included in an electrochemical cell, e.g., a lithium thionyl chloride cell or cells of other active chemistries such as $MnO_2$, carbon monofluoride (CFx) and silver vanadium oxide (SVO), for example.

DESCRIPTION OF THE PREFERRED EMBODIMENTS

Figure 1:
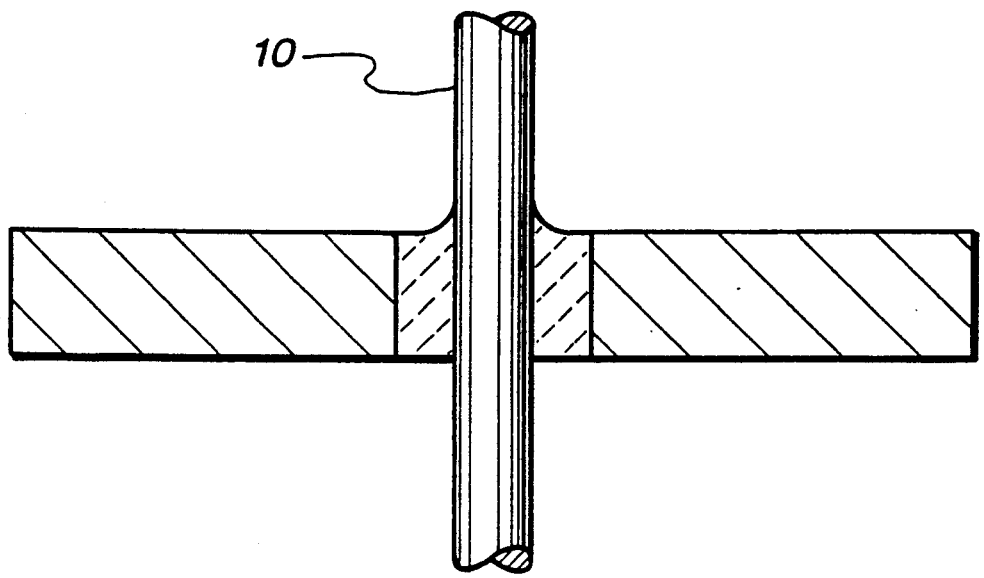
FIG. 1 is a schematic cross-section of a battery header in accordance with the invention.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Figure 2:
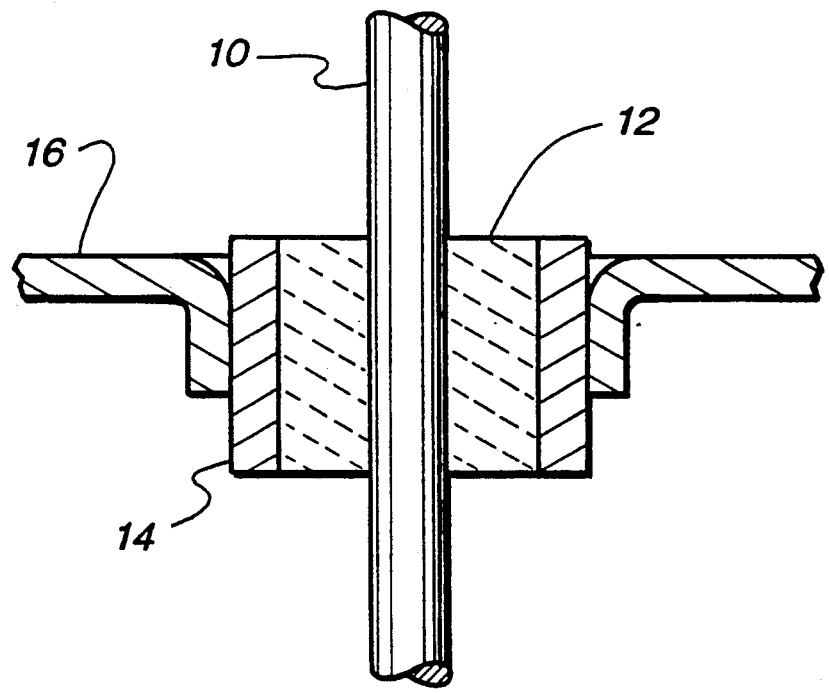
FIG. 2 is a schematic cross-section of a feedthrough with sleeve according to the invention combined with a container of suitable material for use in and electrochemical cell.

Referring now to FIG. 1, a header of typical construction is shown which includes a center pin or electrical contact 10, a glass seal member 12 and a ferrule sleeve or header member 14. This arrangement and that of FIG. 2 are typical seal arrangements which make use of the invention. Other arrangements may be used as well and may take any configuration in which the alloy is wetted by the glass to form a seal.

Referring now to the FIG. 2 the invention in a preferred form includes a terminal 10 extending through a glass seal 12 which is received into a sleeve or header 14. Sleeve 14 may be welded into an opening in a container 16 of, for example, stainless steel. Container 16 may have an electrochemical cell (not shown).

The assembly, requiring no forming weights, is placed in an oven or furnace and heated causing the glass to wet the metallic components forming a hermetic seal between the glass and the components. Such a feedthrough may thereafter be welded if necessary, into any desirable container or the like.

In its preferred form, terminal 10 consists essentially of molybdenum, niobium or tantalum or the like. The glass 12 is TA-23 which is of the following composition, referred to herein as "TA-23":

| Composition | Wt. % Oxide |
| --- | --- |
| $SiO_2$ | 44.95 ± 4.0 |
| $Al_2O_3$ | 20.0 ± 2.0 |
| $B_2O_3$ | 8.0 ± 1.0 |
| $La_2O_3$ | 2.0 ± 0.5 |
| CaO | 12.0 ± 1.0 |
| MgO | 7.0 ± 1.0 |
| SrO | 6.0 ± 1.0 |
| CoO | 0.05 ± 0.02 |

In this glass, the CoO may be omitted and such a resultant composition (most preferred herein) is also included within the term "TA-23" as used herein. Such a modified composition will preferably contain about the following amounts, of constituents:

| Oxide | Wt. % |
| --- | --- |
| $SiO_2$ | 45.0 |
| $Al_2O_3$ | 20.0 |
| $B_2O_3$ | 8.0 |
| CaO | 12.0 |
| SrO | 6.0 |

-continued

| Oxide | Wt. % |
|---|---|
| MgO | 7.0 |
| La₂O₃ | 2.0 |

Ferrule 14, sleeve, Leader 14 or the like is of an alloy consisting essentially of molybdenum, chromium and nickel, wherein the molybdenum content is equal or greater than 1.3 atomic %. When such an alloy is used with a terminal of Mo, Nb or Ta, and in the configuration shown in FIG. 2, a compression seal is formed which is hermetic and corrosion resistant. Examples of such alloys are included in the Table below.

TABLE

| MAT'L | Atomic % | | | | | | | | | | |
|---|---|---|---|---|---|---|---|---|---|---|---|
|  | Mo | Cr | Ni | Fe | Co | Mn | Nb | Ti | Cu | Al | Si |
| 316 SS | 1.3 | 18.5 | 11.8 | 65.6 | — | 2.0 | — | — | — | — | 0.8 |
| CB-20-3 | 1.4 | 21.3 | 32.1 | 40.2 | — | 1.1 | — | — | 3.2 | — | 0.7 |
| INC-625 | 5.7 | 24.7 | 64.6 | 02.2 | — | 0.2 | 2.1 | 0.4 | — | — | 0.1 |
| MP-35N | 5.8 | 23.2 | 36.8 | 00.3 | 32.7 | — | — | 0.9 | — | — | 0.3 |
| Elgiloy | 6.2 | 34.8 | 26.0 | 23.7 | 04.1 | 4.0 | — | — | — | — | 1.2 |
| Hastelloy C-276 | 9.5 | 18.8 | 61.2 | 05.6 | 01.5 | 0.8 | — | 0.1 | — | — | 2.5 |
| Waspalloy | 2.2 | 20.4 | 55.9 | 1.6 | 14.0 | — | 3.7 | — | — | 1.9 | 0.3 |

Hastelloy is a trademark of Haynes International, Inc., Elgiloy is a trademark of American Gage & Machine Company. Inconel is a trademark of International Nickel Company, Inc., and Waspaloy is a trademark of United Technologies Corporation.

Figure 3:
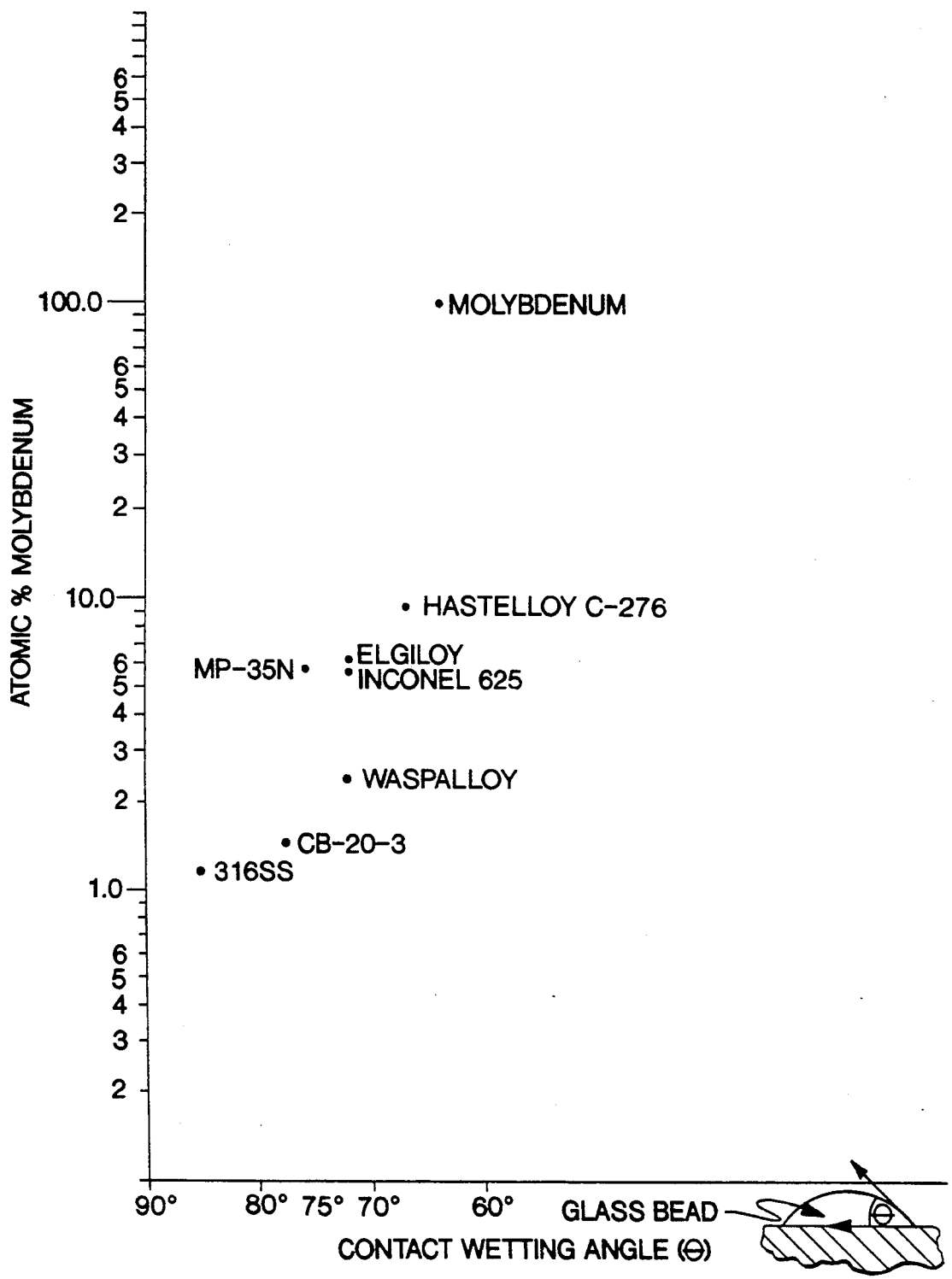
FIG. 3 is a chart showing the contact wetting angle versus molybdenum content relationships between TA-23 glass and molybdenum/chromium/nickel alloys of known composition.
Figure 4:
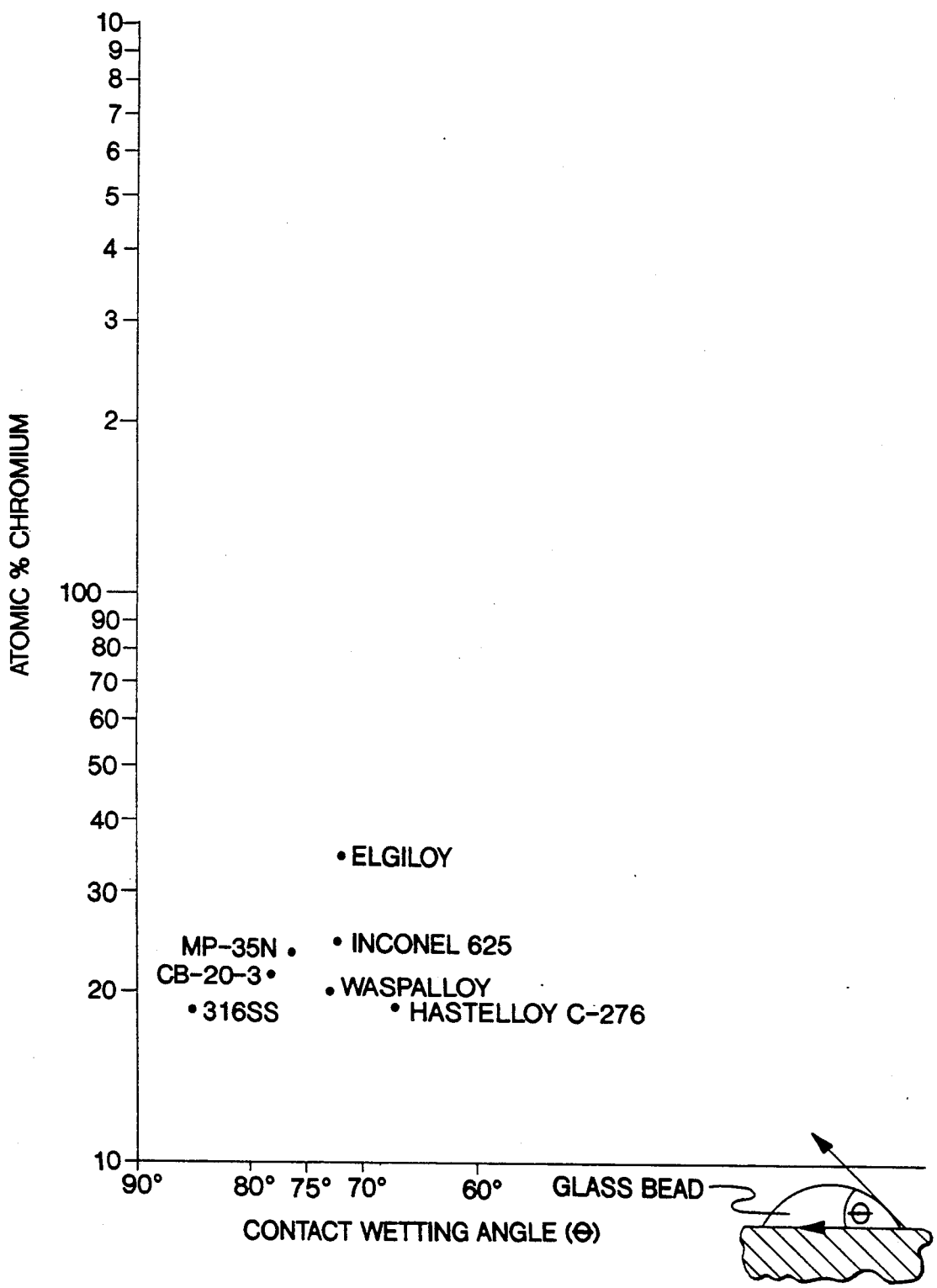
FIG. 4 is a chart showing the contact wetting angle versus chromium content relationships between TA-23 glass and molybdenum/chromium/nickel alloys of known composition.
Figure 5:
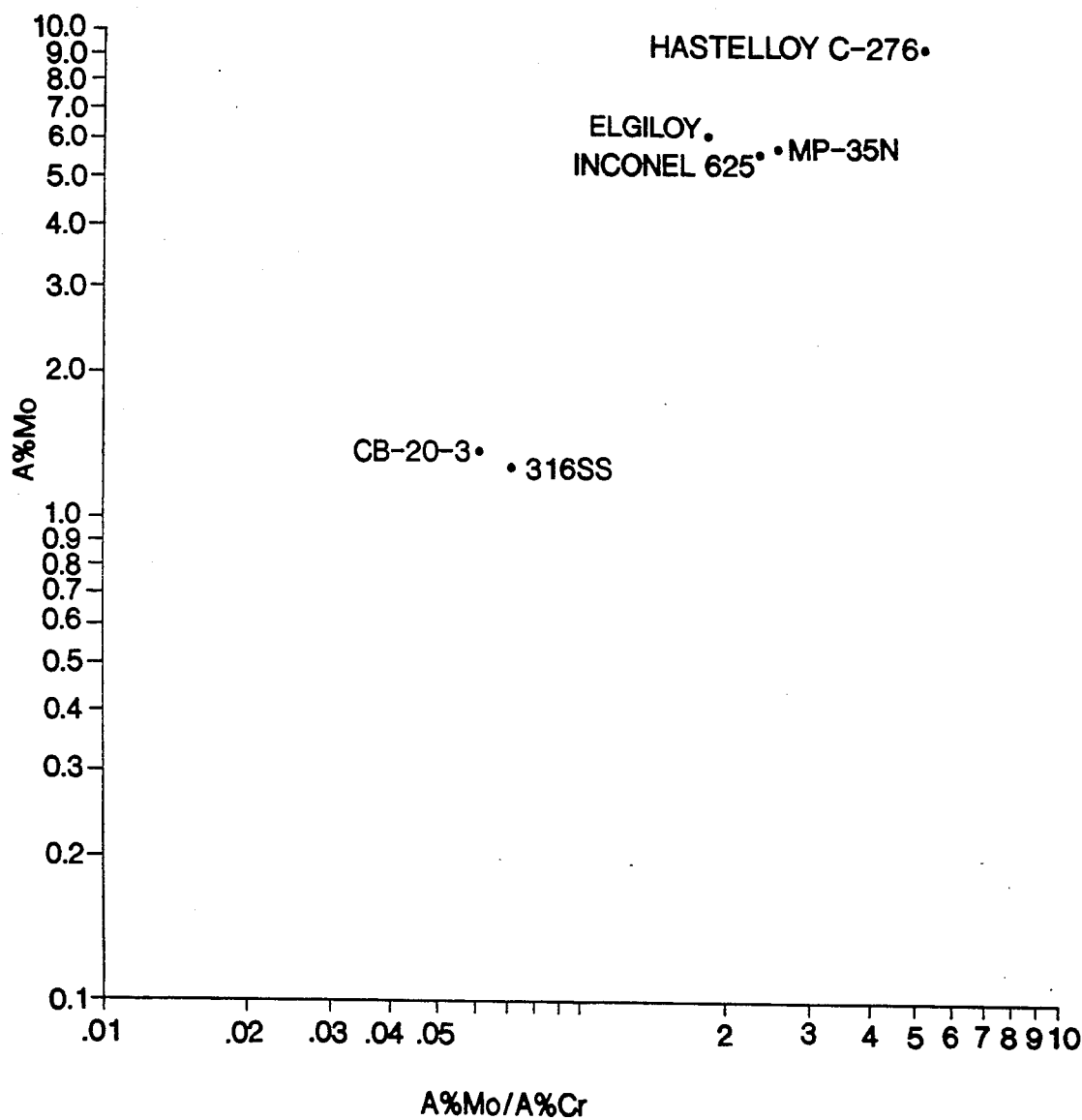
FIG. 5 is a chart showing the atomic % molybdenum versus the atomic % ratio of molybdenum/chromium for the alloys included in the charts of FIG. 3 and FIG. 4.

Referring now to FIGS. 3-4, these are charts which describe the contact wetting angle relationships between TA-23 glass and the alloys of the Table. The contact angle was measured, as indicated schematically in the FIGS. by melting a standard volume of TA-23 glass on a flat sample of each alloy and measuring the angle as indicated in terms of degrees less than 90°. Essentially, the smaller the wetting angle, the better the wetting. The data in the chart of FIG. 3 shows a general trend of favorable wetting to alloys with increasing molybdenum content. The data in the chart of FIG. 4 demonstrates the wetting by TA-23 glass of the same alloys with respect to chromium content. Although less obvious, there is a general trend indicating the importance of chromium but not as important as for the molybdenum content. The data of FIG. 5, A%Mo vs. A%Mo/A%Cr, confirms this conclusion and demonstrates that molybdenum is the primary wetting enhancer and that chromium is a secondary wetting enhancer for TA-23 glass.

As already indicated, alloys used in feedthroughs and similar seals need to be wet by the glass in forming the seal. However, the alloy must also be machinable, corrosion resistant, oxidation resistant and readily available, etc. Thus, nickel is included in the alloys described herein as an important essential ingredient.

As can be seen from the Table, other ingredients may be included in addition to the essential Mo, Cr and Ni, such as optional major amounts of iron and/or cobalt and optional minor amounts of manganese, niobium, tantalum, copper, aluminum and silicon. Many times iron is added to stainless steels as a replacement for some of the nickel, this reducing cost.

This completes the description of the preferred and alternate embodiments of the invention. Those skilled in the art may recognize other equivalents to the specific embodiments described herein, which equivalents are intended to be encompassed by the claims attached hereto.

Having described the invention, the exclusive rights and privileges thereto are to be defined by the foregoing claims in the light of the foregoing description.

What is claimed is:

1. An electrical feedthrough comprising an electrical terminal, a glass insulator comprising nominally 45.0 weight % $SiO_2$, 20.0 weight % $Al_2O_2$, 8.0 weight % $B_2O_3$, 12.0 weight % CaO, 6.0 weight % SrO, 7.0 weight % MgO and 2.0 weight % $La_2O_3$ positioned around a portion of the terminal and in sealing engagement therewith and an alloy sleeve or header positioned around a portion of the glass insulator for receiving same in sealing engagement therewith, the alloy comprising at least 1.3 atomic % molybdenum, and 30.3 to 80 atomic % chromium and nickel combined.

2. The feedthrough of claim 1 in which the alloy comprises nominally 5.8 atomic % molybdenum, 23.2 atomic % chromium, 36.8 atomic % nickel and 32.7 atomic % cobalt.

3. The feedthrough of claim 1 in which the alloy comprises nominally 1.3 atomic % molybdenum, 18.5 atomic % chromium, 11.8 atomic % nickel and 65.6 atomic % iron.

4. The feedthrough of claim 1 in which the alloy comprises nominally 9.5 atomic % molybdenum, 18.8 atomic % chromium, 61.2 atomic % nickel and 5.6 atomic % iron.

5. The feedthrough of claim 1 in which the alloy comprises nominally 6.2 atomic % molybdenum, 34.8 atomic % chromium, 26.0 atomic % nickel and 23.7 atomic % iron.

6. The feedthrough of claim 1 in which the alloy comprises nominally 5.7 atomic % molybdenum, 24.7 atomic % chromium, and 64.6 atomic % nickel.

7. The feedthrough of claim 1 in which the alloy comprises nominally 1.4 atomic % molybdenum, 21.3 atomic % chromium, 32.1 atomic % nickel and 40.2 atomic % iron.

8. The feedthrough of claim 1 in which the alloy comprises nominally 2.2 atomic % molybdenum, 20.4 atomic % chromium, 55.9 atomic % nickel and 14.0 atomic % cobalt.

9. An electrochemical cell of the type including corrosive contents in a container and wherein the container includes an opening carrying an electrical terminal which extends from the interior of the cell through the opening and into the interior thereof; a feedthrough assembly positioned in the opening and around the terminal, the assembly comprising; a sleeve or header attached to the container, the sleeve or header consisting essentially of an alloy comprising at least 1.3 atomic % molybdenum, and 30.3 to 80 atomic % chromium and nickel combined and a glass seal carried by the sleeve or header and surrounding the terminal in sealing engagement therewith, the glass of the glass seal comprising nominally 45.0 weight % SiO$_2$, 20.0 weight % Al$_2$O$_3$, 8.0 weight % B$_2$O$_3$, 12.0 weight % CaO, 6.0 weight % SrO, 7.0 weight % MgO and 2.0 weight % La$_2$O$_3$.

10. The cell of claim 9 in which the feedthrough seal is hermetic and of the compression type by virtue of a terminal of niobium, molybdenum, tantalum or an alloy thereof and a sleeve or header of said molybdenum-containing alloy.

11. The cell of claim 9 in which the molybdenum-containing alloy comprises nominally 5.8 atomic % molybdenum, 23.2 atomic % chromium, 36.8 atomic % nickel and 32.7 atomic % cobalt.

12. The cell of claim 9 in which the molybdenum-containing alloy comprises nominally 1.3 atomic % molybdenum, 18.5 atomic % chromium, 11.8 atomic % nickel and 65.6 atomic % iron.

13. The cell of claim 9 in which the molybdenum-containing alloy comprises nominally 9.5 atomic % molybdenum, 18.8 atomic % chromium, 61.2 atomic % nickel and 5.6 atomic % iron.

14. The cell of claim 9 in which the molybdenum-containing alloy comprises nominally 6.2 atomic % molybdenum, 34.8 atomic % chromium, 26.0 atomic % nickel and 23.7 atomic % iron.

15. The cell of claim 9 in which the molybdenum-containing alloy comprises nominally 5.7 atomic % molybdenum, 24.7 atomic % chromium, and 64.6 atomic % nickel.

16. The cell of claim 9 in which the alloy comprises nominally 1.4 atomic % molybdenum, 21.3 atomic % chromium, 32.1 atomic % nickel and 40.2 atomic % iron.

17. The cell of claim 9 in which the alloy comprises nominally 2.2 atomic % molybdenum, 20.4 atomic % chromium, 55.9 atomic % nickel and 14.0 atomic % cobalt.

* * * * *